US011281292B2

(12) United States Patent
Nishimaki et al.

(10) Patent No.: US 11,281,292 B2
(45) Date of Patent: Mar. 22, 2022

(54) INFORMATION PROCESSING APPARATUS, CONTROL METHOD, PROGRAM, AND STORAGE MEDIA

(71) Applicant: SONY INTERACTIVE ENTERTAINMENT INC., Tokyo (JP)

(72) Inventors: Yoichi Nishimaki, Kanagawa (JP); Yasushi Okumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 21 days.

(21) Appl. No.: 16/342,380

(22) PCT Filed: Oct. 18, 2017

(86) PCT No.: PCT/JP2017/037731
§ 371 (c)(1),
(2) Date: Apr. 16, 2019

(87) PCT Pub. No.: WO2018/079382
PCT Pub. Date: May 3, 2018

(65) Prior Publication Data
US 2019/0235626 A1    Aug. 1, 2019

(30) Foreign Application Priority Data

Oct. 28, 2016 (JP) .............................. JP2016-212078

(51) Int. Cl.
*G06F 3/01* (2006.01)
*A63F 13/211* (2014.01)
(Continued)

(52) U.S. Cl.
CPC .............. *G06F 3/014* (2013.01); *A63F 13/20* (2014.09); *A63F 13/211* (2014.09);
(Continued)

(58) Field of Classification Search
CPC ........ G06F 3/014; G06F 3/0346; A63F 13/20; A63F 13/211; A63F 13/24; A63F 13/235; A63F 13/212; A63F 13/428
See application file for complete search history.

(56) References Cited

U.S. PATENT DOCUMENTS

2002/0175894 A1\*  11/2002  Grillo ................. G06F 3/03549
                                                                              345/156
2009/0219677 A1\*  9/2009  Mori ......................... A45F 5/00
                                                                              361/679.03
(Continued)

FOREIGN PATENT DOCUMENTS

JP          2000222097 A        8/2000
JP          2002032788 A        1/2002
(Continued)

OTHER PUBLICATIONS

Na Jin Seo and Thomas J. Armstrong, "Investigation of Grip Force, Normal Force, Contact Area, Hand Size, and Handle Size for Cylinder Handles", Oct. 2008, Human Factors, vol. 50, No. 5, pp. 734-744, Human Factors and Ergonomics Society. (Year: 2008).\*

(Continued)

*Primary Examiner* — Patrick N Edouard
*Assistant Examiner* — Joseph P Fox
(74) *Attorney, Agent, or Firm* — Katten Muchin Rosenman LLP

(57) ABSTRACT

An information processing apparatus connected to a first device fixed to a left hand of a user and a second device fixed to a right hand of the user: detects positions of the first device and the second device; and calculates information associated with sizes of the hands of the user on the basis of the difference between the detected positions.

9 Claims, 5 Drawing Sheets

(51) Int. Cl.
*A63F 13/24* (2014.01)
*A63F 13/235* (2014.01)
*A63F 13/20* (2014.01)
*G06F 3/0346* (2013.01)

(52) U.S. Cl.
CPC ............ *A63F 13/235* (2014.09); *A63F 13/24* (2014.09); *G06F 3/0346* (2013.01)

(56) References Cited

U.S. PATENT DOCUMENTS

| | | | | |
|---|---|---|---|---|
| 2009/0262073 | A1* | 10/2009 | Rigazio | ............ H04N 21/42224 345/158 |
| 2010/0007528 | A1* | 1/2010 | Urata | ........................ G06F 1/16 341/20 |
| 2011/0043475 | A1* | 2/2011 | Rigazio | ................ H04N 5/4403 345/173 |
| 2014/0235225 | A1 | 8/2014 | Forutanpour et al. | |
| 2017/0235364 | A1* | 8/2017 | Nakamura | .............. G06F 3/016 345/156 |

FOREIGN PATENT DOCUMENTS

| | | |
|---|---|---|
| JP | 2011-156166 A | 8/2011 |
| JP | 2011523730 A | 8/2011 |
| JP | 2013-511765 A | 4/2013 |
| JP | 2013123940 A | 6/2013 |
| WO | 2009131987 A2 | 10/2009 |
| WO | 2011/062663 A1 | 5/2011 |
| WO | 2016038953 A1 | 3/2016 |

OTHER PUBLICATIONS

International Search Report and Written Opinion dated Dec. 5, 2017, from International Application No. PCT/JP2017/037731, 6 sheets.
International Preliminary Report on Patentability dated May 9, 2019, from International Application No. PCT/JP2017/037731, 11 sheets.
Notice of Reasons for Refusal dated Jul. 13, 2021, for Japanese Patent Application No. 2020-091575, 3 sheets.
Notice of Reasons for Refusal dated Dec. 13, 2021, from Japanese Patent Application No. 2020-091575, 4 sheets.

* cited by examiner (a)

(b)

(c)

INFORMATION PROCESSING APPARATUS, CONTROL METHOD, PROGRAM, AND STORAGE MEDIA

TECHNICAL FIELD

The present invention relates to an information processing apparatus such as a home video game console, a control method, a program, and a recording media.

BACKGROUND ART

A controller device in a home video game console or the like detects an operation such as button depressing, or shaking of a device which is performed by a user, and sends information representing the operation by the user thus detected to a main body of a game console or the like. Heretofore, for example, a device which is installed in a hand of a user like a glove, and which detects a movement of a finger has been known as such a controller.

SUMMARY

Technical Problem

However, in the case where processing for reflecting the information associated with the movement of the finger detected by the past device described above on a movement or the like of a hand of a character in a virtual space within a game, when a difference between a body size such as a size of a hand of the character in the virtual space, and a body size such as a size of a hand of a user himself/herself or the like becomes large, it is decided that the character touches an object within the virtual space in a distance in which the user thinks no touch, the hand of the character within the virtual space does not reach an object which the user thinks that he/she grasps the object, in some cases. As a result, it is felt that a sense of immersion is reduced, as the operability is low in some cases.

The present invention has been made in the light of the actual situation described above, and it is one of objects of the present invention to provide an information processing apparatus, a control method, a program, and a recording media each of which can enhance operability.

Solution to Problem

An information processing apparatus according to one aspect of the present invention, connected to a first device fixed to a left hand of a user and a second device fixed to a right hand of the user includes: detection means detecting positions of the first device and the second device; and calculation means calculating information associated with sizes of the hands of the user on the basis of a difference between the detected positions.

Advantageous Effect of Invention

As a result, the information associated with the sizes of the hands, or the like of the user is obtained, and the operability can be enhanced.

DESCRIPTION OF EMBODIMENT

An embodiment of the present invention will be described with reference to drawings. It should be noted that in the following description, sizes, rates, arrangement, and the like of the sections are an example, and the embodiment is by no means limited to the size, the rate, and the arrangement of the sections depicted.

An information processing apparatus 1 according to an embodiment of the present invention, for example, is a computer apparatus such as a home video game console, and a device 20 is connected to the information processing apparatus 1.

The device 20 is a controller device or the like which is installed in a left hand or a right hand of a user to be fixed thereto. In the case where in the following description, the device 20 fixed to the left hand of the user, and the device 20 fixed to the right hand of the user need to be distinguished from each other, the device 20 fixed to the left hand of the user is expressed by the device 20L, and the device 20 fixed to the right hand of the user is expressed by the device 20R. In such a manner, the codes L and R are added to the devices 20, thereby distinguishing those devices 20L, 20R from each other.

Figure 1:
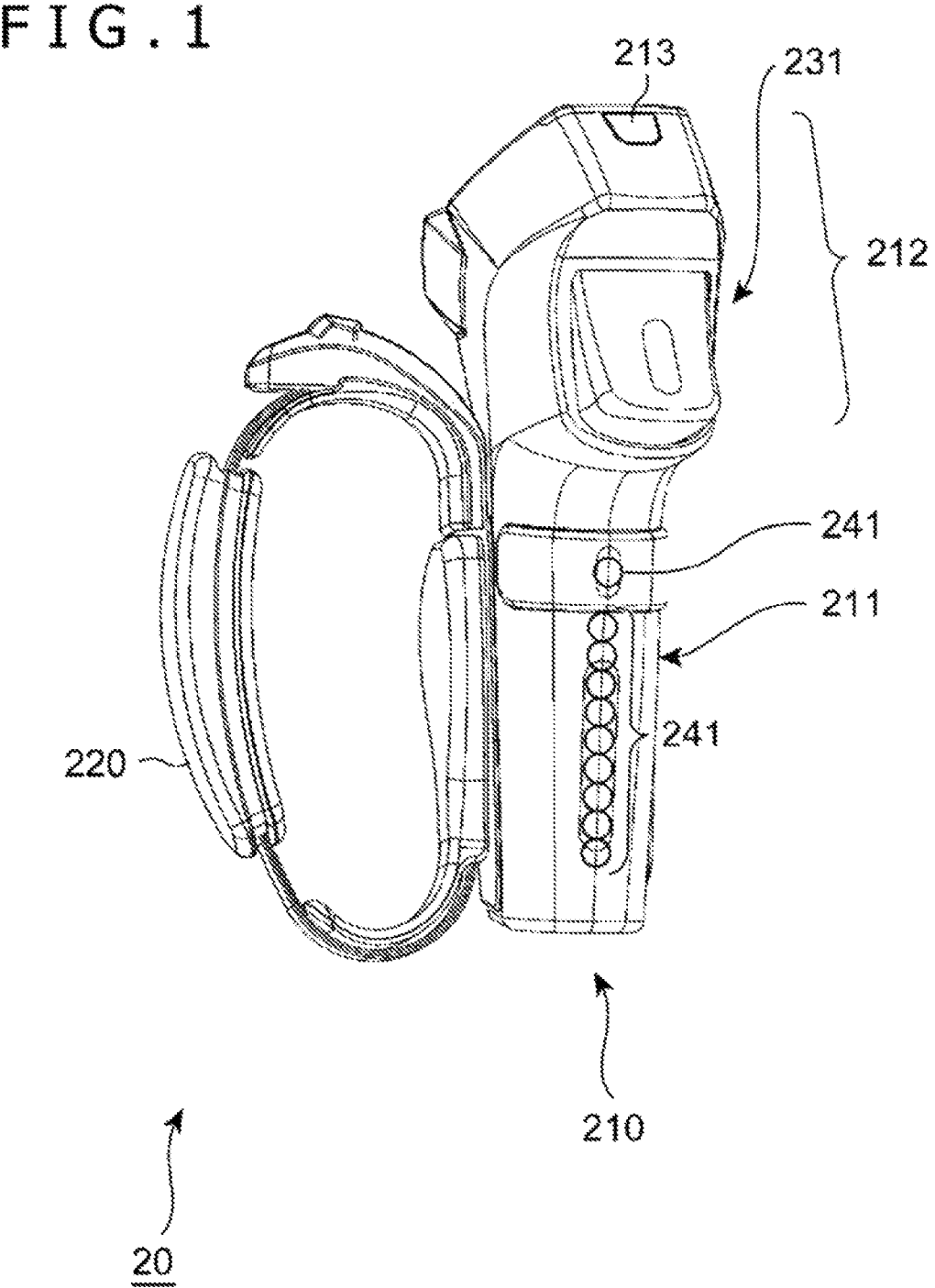
FIG. 1 is a schematic perspective view depicting an example of a device connected to an information processing apparatus of an embodiment of the present invention.
Figure 2:
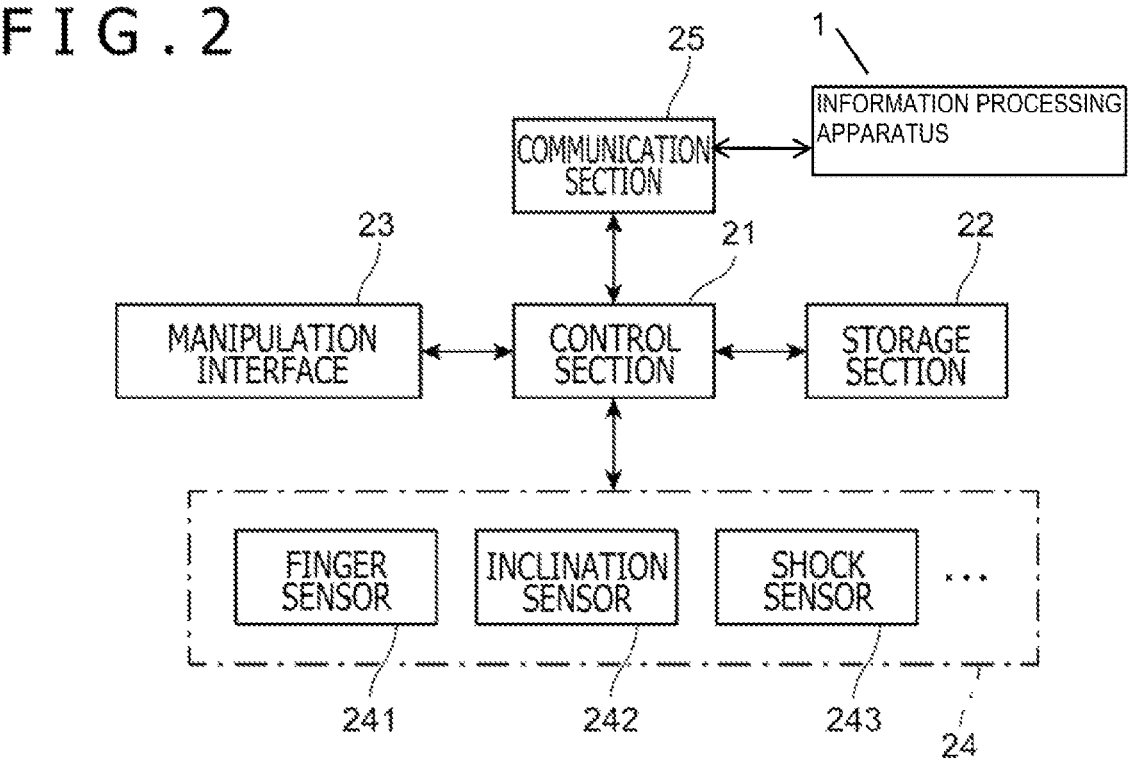
FIG. 2 is a block diagram depicting an example of a configuration of the device connected to the information processing apparatus of the embodiment of the present invention.

An example of this device 20, as exemplified in outline thereof in FIG. 1, includes a device main body 210 and a fixture 220 fixed to the device main body 210. In addition, the device 20, as depicted in FIG. 2, includes a circuit section including a control section 21, a storage section 22, a manipulation interface 23, a sensor section 24, and a communication section 25. In an example of the embodiment, this circuit section is accommodated in the device main body 210.

The device main body 210 which is to be installed in the left hand of the user, and the device main body 210 which is to be installed in the right hand of the user may be identical in shape to each other. In the example of the embodiment, the fixture 220 is made by causing a flexible belt to have an annular shape. The index finger, the middle finger, the ring finger, and the little finger of the user are made to pass through the fixture 220, and the device main body 210 is fixed to a position where the device main body 210 of the user is brought into contact with the base of the thumb of the user (a position corresponding to MP (meta phalangeal) joints of the index finger, the middle finger, the ring finger, and the little finger) to be used.

The device main body 210 includes a gripper 211 which is gripped by the user, a manipulation section 212, and a position presenting section 213. In the example of the embodiment, the gripper 211 has substantially a polygonal columnar shape. The manipulation section 212 is formed continuously from the gripper 211, and in the example of FIG. 1 includes a button manipulation section 231. In addition, a finger sensor 241 of a sensor section 24 which will be described later is provided on the back surface side of the device main body 210 (the side of the surface facing the finger side when the side surface of the device main body 210 is brought into contact with the palm of the hand of the user to be fixed). The position presenting section 213 is arranged on the back surface on the relatively upper side (when being fixed to the hand of the user, the thumb finger side) back surface of the device main body 210, and includes at least one light emitting element such as an LED (light emitting diode). The position presenting section 213 shall emit light of a color previously specified, which is inherent every device 20 during the operation of the device 20. In addition, it is only necessary that the position presenting section 213 can detect the positions of the devices 20 from the outside based on a marker or the like of the inherent color every device 20, and thus the light emitting element may not be necessarily used.

In addition, the size of the device 20 is such that when the user naturally grasps the device main body 210, one end thereof is located slightly outside with respect to a position where the head of the thumb of the user (so-called thumb) reaches, and the other end thereof is located in a position slightly protruding from the base of the little finger (a position corresponding to the MP joint). Note that, even if the user opens the hand in a state in which the device 20 is in use by the user, since the device 20 is fixed to the hand of the user by the fixture 220, the device 20 does not fall.

In an example of the embodiment, the finger sensor 241 is an optical sensor, and has a light emitting section for radiating infrared light, and a light receiving section for detecting the infrared light. The finger sensor 241 measures amount of incident light that has been radiated from the light emitting section and reflected by an object to be made incident to the light receiving section, thereby detecting a distance to an obstacle. The distance from the position of the finger section 241 to the obstacle located on the back surface side of the device main body 210 (the surface facing the finger side when the side surface of the device main body 210 is brought into contact with the palm of the hand of the user to be fixed) is detected. In the example, when the user fixes the device main body 210 to his/her hand, and moves his/her hand from a state in which the fingers are extended to a state in which the user grips the device main body 210, if the fingers are in the extended state, the finger sensor 241 shall detect the distance to the obstacle located in a direction of the tips of the fingers of the user (for example, a floor or the like in the state in which the user directs his/her finger downward). Thereafter, when the finger of the user is bent, a distance to a surface of either the second joint or the third joint of the finger is detected. In the state in which the user grips the device main body 210, since the surface of the finger contacts the finger sensor 241, the distance detected by the finger sensor 241 becomes "0."

Note that, the finger sensors 241 may be provided so as to correspond to at least each the index finger, the middle finger, the ring finger, and the little finger, respectively, and the finger sensors 241 may obtain the information associated with the respective distances up to the obstacle. Alternatively, the finger sensors 241 may be provided so as to correspond to partial fingers (only one finger is available) among the index finger, the middle finger, the ring finger, and the little finger, thereby obtaining the information associated with the respective distances to the obstacle. Moreover, five or more finger sensors 241 may be provided, and may be arranged in a line on the back surface side of the device 20 (the surface facing the finger side when the side surface of the device main body 210 is brought into contact with the palm of the hand of the user to be fixed). In addition, the finger sensor 241 shall repetitively detect a distance to the obstacle every predetermined timing, and shall output the information associated with the detected distance.

In the embodiment, here, the control section 21 is a program-controlled device such as a CPU (central processing unit), and operates in accordance with a program stored in the storage section 22. In the embodiment, the control section 21 receives an input of information representing the contents of the manipulation performed in the manipulation section 212 by the user from the manipulation interface 23, and outputs the information of interest to the information processing apparatus 1 through the communication section 25. In addition, the control section 21 outputs the information, which is outputted from the sensor included in the sensor section 24, to the information processing apparatus 1 through the communication section 25.

The storage section 22 is a memory device or the like, and holds therein the program which is to be executed by the control section 21. The program may be stored in a computer-readable and non-temporary storage media to be provided, and may be copied to the storage section 22. In addition, the storage section 22 operates as a work memory as well of the control section 21.

The manipulation interface 23 outputs the information representing the contents of the manipulation performed in the manipulation portion 212 by the user to the control section 21. The sensor section 24 includes at least one sensor, and outputs the information outputted from the sensor of interest to the control section 21. In an example of the embodiment, the sensor section 24, in addition to the finger sensor 241 which is previously described, may also include an inclination sensor 242 for detecting an inclination of the device main body 210 of the device 20, and a shock sensor 243.

Here, the inclination sensor 242 detects information associated with an angle of rotation about an axis in a longitudinal direction of the device main body 210, and information associated with an angle with respect to a direction of the gravity of the axis in the longitudinal direction, and outputs these pieces of information. The shock sensor 243 is an acceleration sensor, and when the hand (including the finger) loaded with the device 20 strikes another object (such as the other hand) to generate a shock, detects the shock of interest, and outputs information associated with the effect that the shock is detected.

The communication section 25 is a wired interface such as a USB (universal serial bus) interface, or a wireless interface such as Bluetooth (registered trademark), and outputs various pieces of information to the information processing apparatus 1 in accordance with an instruction inputted thereto from the control section 21.

Figure 3:
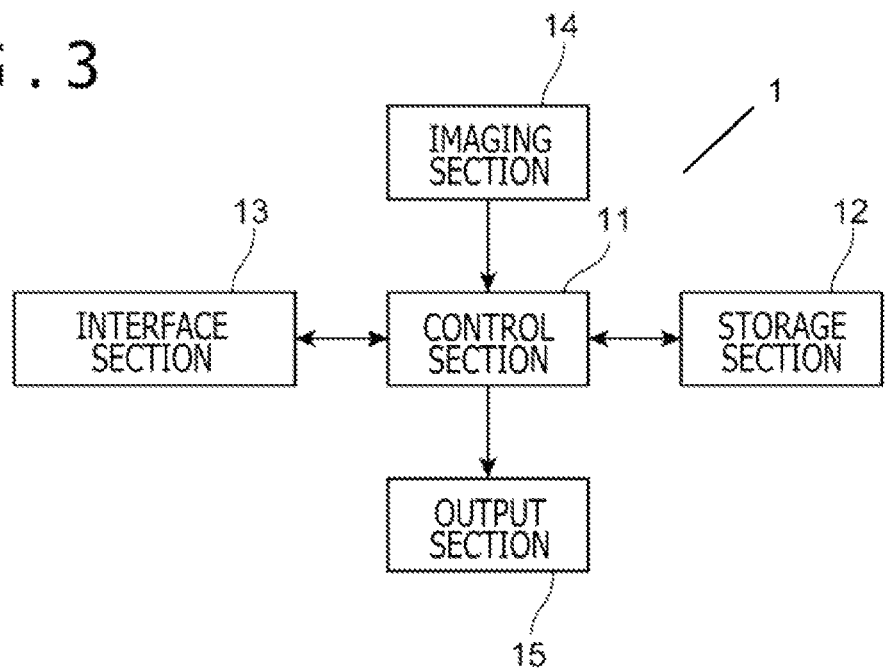
FIG. 3 is a block diagram depicting an example of a configuration of the information processing apparatus of the embodiment of the present invention.

The information processing apparatus 1, as exemplified in FIG. 3, includes a control section 11, a storage section 12, an interface section 13, an imaging section 14, and an output section 15. The control section 11 is a program-controlled device such as a CPU, and operates in accordance with a program stored in the storage section 12. In the embodiment, the control section 11 detects the position of the first device fixed to the left hand of the user and the position of the second device fixed to the right hand of the user, and calculates information associated with the size of the hand of the user on the basis of a difference between the positions thus detected. Contents of concrete processing of the control section 11 will be described in detail later.

The storage section 12 is a memory device or the like, and holds therein the program which is to be executed by the control section 11. The program may be stored in a computer-readable and non-temporary storage media to be provided, and may be copied to the storage section 12. In addition, the storage section 12 operates as a work memory of the control section 11. In the example of the embodiment, the storage section 12 holds therein a database of body proportions regarding the rates of lengths or sizes between portions of the body of an average user.

The interface section 13 is connected to the device 20 in a wireless or wired manner. The interface section 13 receives the information representing the contents of the manipulation by the user from the device 20, and the information associated with the distance detected by the finger sensor 241 (the information associated with a plurality of distances detected by the finger sensors corresponding to the respective fingers, in the case where there is a plurality of finger sensors 241 in correspondence to the fingers), and outputs the pieces of information of interest to the control section 11.

The imaging section 14 is a camera or the like which is installed with a range in which the user is located as an image range, and repetitively captures an image including the user image every predetermined timing, and outputs the data associated with the image of interest to the control section 11.

The output section 15 has an interface, for outputting an image or the like to a consumer-use television, such as an HDMI (registered trademark) interface. The output section 15 outputs information associated with an image to be displayed in accordance with an instruction inputted thereto from the control section 11.

Figure 4:
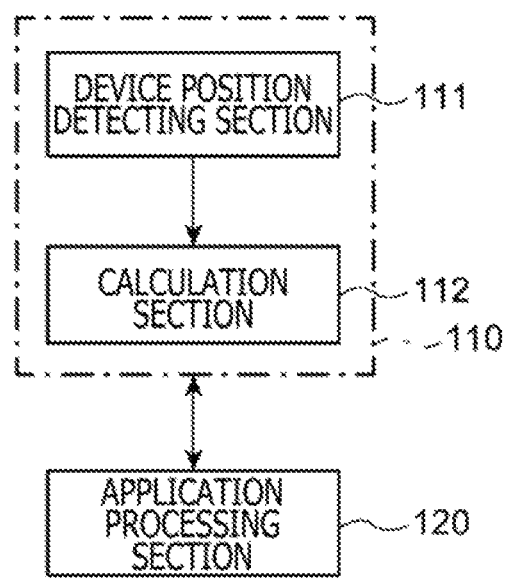
FIG. 4 is a functional block diagram of an example of the information processing apparatus of the embodiment of the present invention.

Next, a description will be given with respect to an operation of the control section 11 of the embodiment. The control section 11 of the embodiment, in terms of a function, as exemplified in FIG. 4, includes a measurement processing section 110, and an application processing section 120. In addition, the measurement processing section 110 includes a device position detecting section 111 and a calculation section 112.

The measurement processing section 110 starts the operation at a predetermined timing such as at the time of activation or connection of the device 20, or input of an instruction from the application processing section 120. When the operation of the measurement processing section 110 is started, the device position detecting section 111 of the measurement processing section 110 detects the position presenting section 213 of the device 20 from the image data outputted from the imaging section 14.

Specifically, the device position detecting section 111 receives the image data outputted from the imaging section 14, and detects the positions of the position presenting sections 213L and 213R of the devices 20L and 20R which are respectively fixed to the left and right hands of the user from the image data of interest. Since such a detection method in the position presenting section is widely known, a detailed description is omitted here.

The device position detecting section 111 obtains information associated with a position expressed in the x, y, z orthogonal coordinate system in which, for example, an optical axis direction of the camera of the imaging section 14 is set as a z-axis, a horizontal direction of the captured image is set as an x-axis, and a vertical direction of the captured image is set as a y-axis. In a word, the device position detecting section 111 shall obtain information PL (xL, yL, zL) associated with the position of the position presenting section 213L of the device 20L, and information PR (xR, yR, zR) associated with the position of the position presenting section 213R of the device 20R.

When the device position detecting section 111 detects the positions of the position presenting sections 213L and 213R of the devices 20L and 20R which are respectively fixed to the left and right hands of the user, the calculation section 112 calculates a difference between the positions of the position presenting sections 213L and 213R of the devices 20L and 20R thus detected, and obtains the information associated with the distance between the devices 20L and 20R on the basis of the difference between the positions by performing the calculation. Then, the calculation section 112 calculates the information associated with the size of the hand of the user on the basis of the information associated with the distance of interest.

In an example of the embodiment, it is requested for the user that after the device 20 fixed to the hand of the user is connected to the information processing apparatus 1, the predetermined pose is held to initialize the device 20. As an example, this request may be presented to the user in the state of being printed on a paper, or as will be described later, an instruction is issued to the output section so as to display an image that "Please, hold a next pose." In addition, here, the predetermined pose is set as a pose in a state in which, for example, are exemplified in FIG. 5, the left and right hands are opened to direct the palms of both the hands to the user side, the tips of the middle fingers are brought into contact with each other in a state in which the fingers are extended, so that the length direction of the left and right middle fringes lies on a straight line.

In this example, after the device 20 fixed to the hand of the user is connected to the information processing apparatus 1, in a state in which the user holds the predetermined pose with his/her hands, the calculation section 112 obtains information PL associated with the position of the position presenting section 213L of the device 20L fixed to the left hand, and information PR associated with the position of the position presenting section 213R of the device 20R fixed to the right hand. The calculation section 112 calculates a distance between these positions represented by the resulting pieces of information. The distance thus calculated represents the distance between the devices 20. Since the device 20 is fixed to the positions corresponding to the MP joints of the index finger, the middle finger, the ring finger, and the little finger, in the case where the user holds the predetermined pose with his/her fingers, this distance corresponds to a sum of lengths of the middle finger of the left hand, and the middle finger of the right hand.

The calculation section 112 refers the database of the body proportions regarding the rates of lengths or sizes between portions of the body of the average user. The calculation section 112 sets ½ of the distance calculated as the length of the middle finger of the user, and obtains the information associated with the lengths and the sizes of the necessary portions of the body of the user by using the information associated with the rate of the length or size of the portion of the body of the user (for example, the height, the length of the arm, and the like) with respect to the length of the middle finger, and outputs the information of interest to the application processing section 120.

The application processing section 120, for example, executes an application program such as a game application. The application processing section 120 may instruct the measurement processing section 110 to execute the measurement processing in accordance with the application program. In addition, the application processing section 120, for example, displays a character which is controlled within a virtual space by the user. At this time, the application processing section 120 sets the length or size of the corresponding portion of the body of the character within the virtual space on the basis of the information associated with the lengths and sizes of the portions of the body of the user, the information being outputted from the measurement processing section 110, and reflects the setting contents on the display contents.

For example, the application processing section 120 previously sets the size of the hand of the character as the size of the hand corresponding to the size of the average hand (the size of a default). Then, the application processing section 120 obtains a rate r between the size of the default and the information associated with the inputted size of the hand on the basis of the information associated with the size of the hand outputted from the measurement processing section 110 (the width of the hand, in a word, the information including the length from the side surface on the little finger side of the palm to the base of the thumb, and the length from the wrist to the fingertip of the middle finger). Then, the application processing section 120 increases the size of the hand of the character by r-fold in response to the rate r of interest to perform the correction, thereby setting the size of the hand of the character to be displayed.

By the way, at this time, the size of the whole character may be increased by r-fold to perform the correction, or only a portion of the hand of the character (only a part of the body of the character) may be increased by r-fold to perform the correction. In such a way, the size correction based on the information inputted from the measurement processing section 110 may also be performed for at least a part of the character.

In addition, the character needs not to be necessary obtained by mimicking the human body. Thus, the character may have a shape of an animal or a fictional creature, or may be other object such as a character of only the hand. In such cases as well, the application processing section 120 may perform the size correction based on the information inputted thereto from the measurement processing section 110 for the whole of the object of interest, or at least a part of the object of interest.

Then, the application processing section 120 executes processing for performing reflection on the movement or the like of the object, of the character or the like in the virtual space, the size of at least a part of which is set by using the method described above on the basis of the information or the like associated with the movement of the finger detected by the device 20.

By displaying the object (the character or the like) the size of at least a part of which is corrected, the information processing apparatus 1 of the embodiment reduces the difference in the cognitive difference between the size of the body of the user, and the size of the object presented to the user.

[Operation]

The information processing apparatus 1 of the embodiment is basically provided with one or more configuration described above, and operates as follows. By the way, it is assumed that the user fixes a pair of device main bodies 210 to positions where the device main bodies 210 are brought into contact with the vicinities of the bases of the thumbs of the left and right hands of the user (the range corresponding to the MP joints of the index finger, the middle finger, the ring finger, and the little finger).

Figure 5:
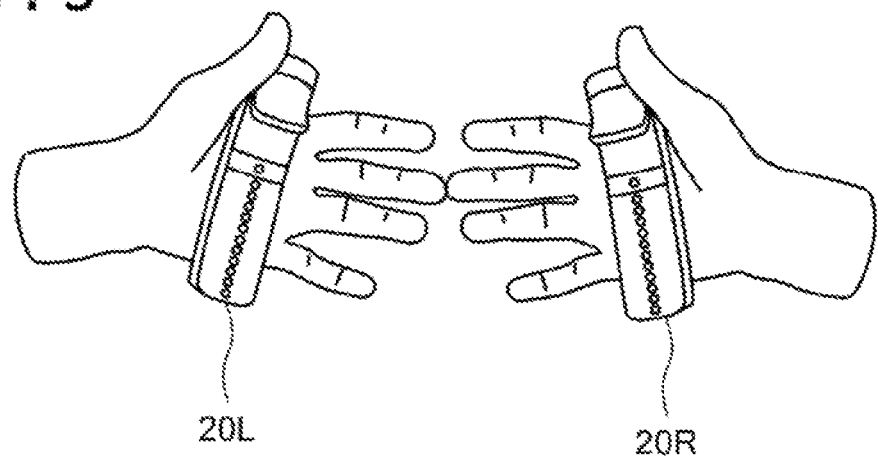
FIG. 5 is an exemplary view depicting an example of a pose with hands of a user when the information processing apparatus of the embodiment of the present invention performs position detection.
Figure 6:
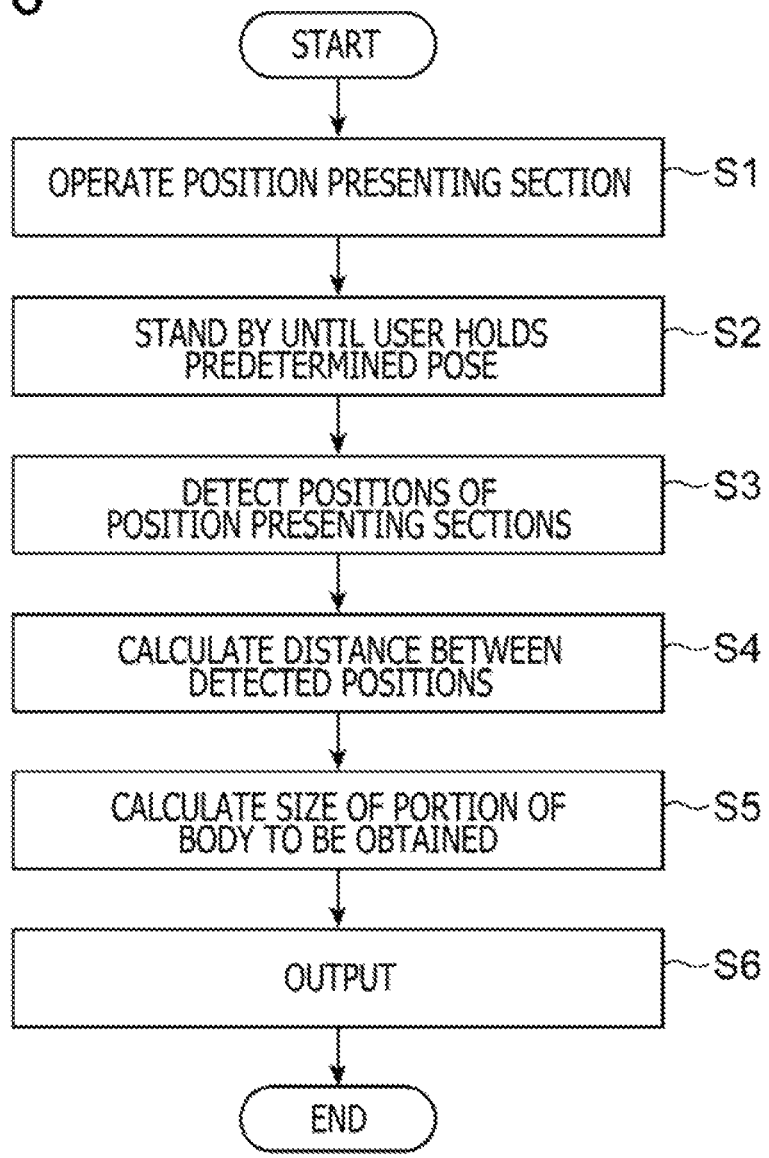
FIG. 6 is a flow chart depicting an example of processing in the information processing apparatus of the embodiment of the present invention.

When the user activates the information processing apparatus 1 to start the communication between the device 20 and the information processing apparatus 1, the information processing apparatus 1 starts the processing exemplified in FIG. 6 to cause the device 20 to light an LED or the position presenting section 213 (S1). At this time, the user holds the predetermined pose with the hands which is previously requested (for example, the pose, exemplified in FIG. 5, in a state in which the fingertips of the middle fingers are brought into contact with each other in a state in which the left and right hands are opened to extend the fingers).

The information processing apparatus 1 stands by only a given period of time until the state is set in which the user holds the pose (S2). It should be noted that although in this case, the information processing apparatus 1 stands by only for the predetermined period of time until the state of interest is set, as will be described later, the embodiment is by no means limited thereto. In addition, the order of the processing S1 and the processing S2 may be reversed. In a word, after standing by only for the given period of time, the LED as the position presenting section 218 may be lighted. The information processing apparatus 1 detects, from the image data outputted from the imaging section 14, the positions of the position presenting sections 213L and 213R of the devices 20L and 20R which are respectively fixed to the left and right hands of the user (S3).

Then, the information processing apparatus 1 obtains the information PL associated with the position of the position presenting section 213L of the device 20L fixed to the left hand, and the information PR associated with the position of the position processing section 213R of the device 20R fixed to the right hand. Then, the information processing apparatus 1 calculates the distance between the positions expressed by the information obtained (S4). Since the device 20 is fixed to the positions corresponding to the MP joins of the index finger, the middle finger, the ring finger, and the little finger, in the case where the user holds the pose with the Hands Exemplified in FIG. 5, this Distance corresponds to the sum of the lengths of the middle finger of the left hand and the middle finger of the right hand.

The information processing apparatus 1 sets ½ of the calculated distance as the length of the middle finger of the user. The information processing apparatus 1 obtains the information associated with the length and the size of the necessary portion of the body of the user by using the rate of the length or size of the portion of the body of the user (for example, the height, the length of the arm, the size of the hand, or the like) with respect to the length of the middle finger by referring to the database of the body proportions (S5). The information processing apparatus 1 applies the resulting information to the processing of the application (S6).

[Example in which Guidance is Performed]

In addition, the information processing apparatus 1 of the embodiment may guide the pose of the hands for the user at the time of the measurement. In this example, when the measurement processing section 110 of the control section 11 starts the operation at the time of the activation, at the time of connection of the device 20, or at the time of input of the instruction from the application processing section 120, the device position detecting section 111 outputs an image which requests the user to hold the predetermined pose with the hands to the output section 15. In the image of interest, the image of the pose with the hands, for example, exemplified in FIG. 5, and the guidance that "Please, hold this pose" are displayed.

Then, for example, after a predetermined period of time (a time which is considered for the user to take to hold the pose with the hands) has elapsed, the information processing apparatus 1 receives the image data outputted from the imaging section 14. Then, the information processing apparatus 1 executes the processing for detecting, from the image data of interest, the positions of the position presenting sections 213L and 213R of the devices 20L and 20R which are respectively fixed to the left and right hands of the user. The following operation of the measurement processing section 110 shall be similar to that of the example previously stated.

Since in the example of interest, the guidance for the pose with the hands is performed, the user easily grasps the timing of the measurement of the user or the pose to be held.

[Another Example of Measurement Method]

In addition, in the example in this case, the positions of the devices 20 which are installed in the left and right hands are detected to calculate the distance between the devices 20, thereby obtaining the length of the finger as the example of the portion of the body of the user. However, the method of measuring a length of a portion of the body of the user in the embodiment is by no means limited thereto. In another example of the embodiment, a length or the like of the finger may be measured by using the finger sensor 241 of the device 20.

Specifically, in the case where the user holds the pose with the hands like the previous example of FIG. 5, measuring the amount of incident light that is infrared light radiated from the finger sensor 241 of the device 20 of one of the left and right hands and then reflected by an obstacle to be made incident to the light receiving section to detect the distance to the obstacle, since the fingers are not bent, the other device 20 becomes the obstacle, and thus the distance to the other device 20 shall be detected.

Then, in this example of the embodiment, when the user activates the information processing apparatus 1 to start the communication between the device 20 and the information processing apparatus 1, the information processing apparatus 1 stands by only for a given period of time until a state is obtained in which the user holds the pose, and outputs an instruction of the effect that the measurement by the finger sensor 241 should be performed to any of the devices 20L and 20R which are respectively fixed to the left and right hands of the user. Then, the finger sensor 241 of the device 20 which is fixed to one hand and which receives the instruction radiates the infrared light, and measures the amount of incident light that has been radiated and then reflected by the obstacle to be made incident to the light receiving section, thereby detecting the distance to the obstacle.

The distance detected at this time is the distance to the device 20 fixed to the other hand, and the device 20 is fixed to the positions corresponding to the MP joints of the index finger, the middle finger, the ring finger, and the little finger. Therefore, in the case where the user holds the pose with the hands exemplified in FIG. 5, this distance corresponds to the sum of the lengths of the middle finger of the left hand and the middle finger of the right hand. Then, the device 20 which performed the measurement outputs the data associated with the detected distance. The information processing apparatus 1 sets ½ of the calculated distance as the length of the middle finger of the user. The information processing apparatus 1 obtains the information associated with the length and the size of the necessary portion of the body of the user by using the rate of the length or size the portion of the body of the user (for example, the height, the length of the arm, the size of the hand or the like) with respect to the length of the middle finger by referring to the database of the body proportions. The information processing apparatus 1 applies the resulting information to the processing of the application.

In addition, although in the description until now, the length of the middle finger is measured, in the embodiment, a length of other finger may also be measured instead of measuring the length of the middle length. In this case as well, based on the measured length of the user, the information processing apparatus 1 may obtain the information associated with the length and the size of the necessary portion of the body of the user by using the rate of the length or size of the portion of the body of the user (for example, the height, the length of the arm, the size of the hand or the like) with respect to the measured length of the finger by referring to the database of the body proportions. The information processing apparatus 1 may apply the resulting information to the processing of the application.

In addition, in the embodiment, the lengths of a plurality of fingers (for example, the lengths of the fingers) may be measured. In this case, the corresponding length and size of the finger of the body of the character within the virtual space may be set based on the length of the finger which is actually measured, and the length or size thus set may be reflected on the display contents.

Moreover, as the target of the measurement in the embodiment, not only the length of the finger, but also a width of the palm of the hand may be measured. In this example, it is assumed that the device 20 is provided with five or more finger sensors 241a, 241b, . . . , and these finger sensors 241a, 241b, . . . are arranged in a line on the back surface side of the device 20 (the surface facing the finger side when the side surface of the device main body 210 is brought into contact with the palm of the hand of the user to be fixed). In addition, it is assumed that the information representing the positions of the finger sensors 241a, 241b, . . . is stored in the storage section 12. The information associated with the positions, for example, may be set as lengths La, Lb, . . . to the finger sensors 241a, 241b, . . . from the upper end of the device 20. In the following, when the finger sensors 241a, 241b, . . . need not to be distinguished from one another, these finger sensors are abbreviated as the finger sensors 241.

At this time, when the user bends the fingers so as to grasp the device 20, the finger sensors 241 of the device 20 lying within the range in which the fingers are present detect a relatively short distance as the distance to the obstacle, and the finger sensors 241 lying beyond the range in which the fingers are present detect a relatively long distance as the distance to the obstacle. Then, if of the finger sensors 241 each of which detects the distance shorter than a predetermined threshold value, the finger sensor 241x at the upper side end of the device 20 and the finger sensor 241y at the lower side end of the device 20 are specified, and a length (|Ly−Lx|, however, |X| means the absolute value of X) between the finger sensor 241x and the finger sensor 241y is calculated, then, the width of the palm of the hand of the user can be measured. That is to say, in this case, the five or more finger sensors arranged in a line correspond to a sensor for detecting the width of the palm of the hand.

In this example as well, the length calculated by the information processing apparatus 1 is set as the width of the palm of the hand of the user, the information processing apparatus 1 obtains the information associated with the length or size of the necessary portion of the body of the user by using the rate of the length or size of the portion of the body of the user (for example, the height, the length of the arm, the size of the hand or the like) with respect to the width of the palm of the hand by referring to the database of the body proportions. The information processing apparatus 1 applies the resulting information to the processing of the application.

For example, the information processing apparatus 1 sets the size or length of at least part of the body of the character to be displayed based on the information obtained associated with the size or length of the portion of the body of the user, and displays the character of interest.

[Another Example of Pose with Hand]

In addition, in the embodiment, the pose of the hands requested for the user at the time of the measurement is by no means limited to that exemplified in FIG. 5. As far as this pose, for example, as exemplified in FIG. 7(*a*), there may be a pose or the like in which the left and right hands are opened to direct the palms of both the hands to the user side and the fingers are extended, and in this state, the fingertips of the index fingers are brought into contact with each other. In such a manner, the pose of interest may be the pose in which the fingertips of the fingers having the same name other than the middle fingers are brought into contact with each other. In these cases, since it is considered that the calculated distance corresponds to twice the length of the finger brought into contact with the other, ½ of the distance calculated by the information processing apparatus 1 is set as the length of the finger brought into contact with the other, and the information associated with the length or size of the portion to be obtained is obtained by referring to the database of the body proportions.

Figure 7:
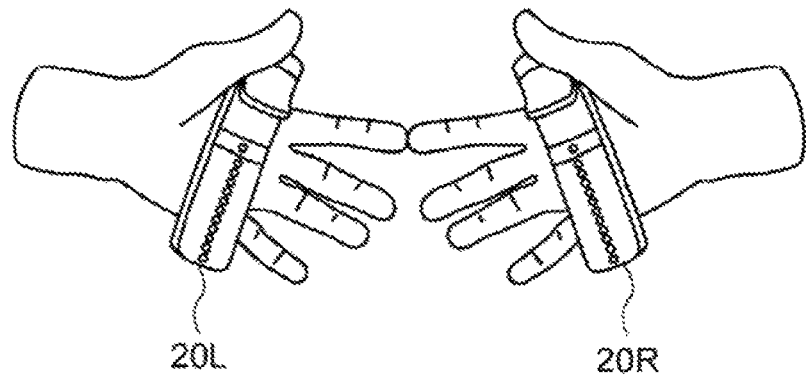
FIG. 7 is an explanatory view depicting another example of poses with the hands of the user when the information processing apparatus of the embodiment of the present invention performs the position detection.
Figure 7:
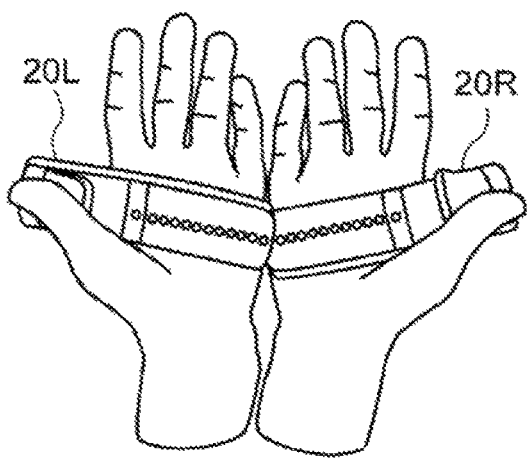
Figure 7:
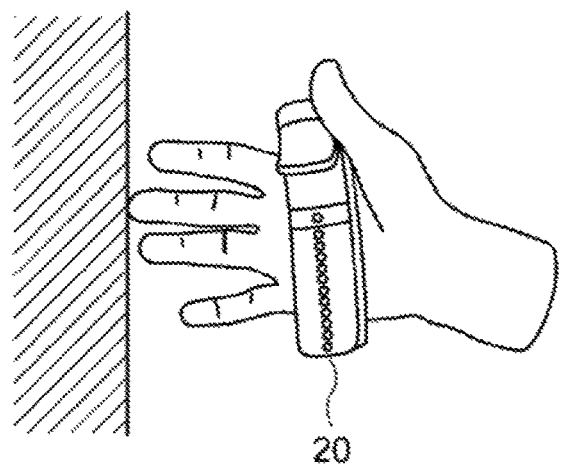

Moreover, the pose of the hands at the time of the measurement, as exemplified in FIG. 7(*b*), may be set as a pose in which the palms of both the hands are directed to the user side, and the side surfaces on the little fingers of both the hands are brought into contact with each other. In this case, if the positions of the position presenting sections 213 arranged on the upper surface sides of the devices 20 are detected to calculated a distance between them, since the calculated distance corresponds to approximately twice the width of the palm of the hand of the user, ½ of the distance calculated by the information processing apparatus 1 is set as the width of the palm of the hand of the user, and the information associated with the length or size of the portion to be obtained is obtained by referring to the database of the body proportions.

In still another example, as exemplified in FIG. 7(*c*), the pose with the hand at the time of the measurement may be set as a pose in which the finger (the longest middle finger) is brought into contact with a wall surface in a state in which the fingers are extended. In this case, a distance from the device 20 to the wall can be measured by using the finger sensors 241. In case of this example, the length calculated by the information processing apparatus 1 is set as the length of the middle finger of the user, the information processing apparatus 1 obtains the information associated with the length and the size of the necessary portion of the body of the user by using the rate of the length or size of the portion of the body of the user (for example, the height, the length of the arm, the size of the hand or the like) with respect to the length of the middle finger by referring to the database of the body proportions. The information processing apparatus 1 applies the resulting information to the processing of the application.

The pose of the hand at the time of the measurement may be instructed by the application processing section 120. That is to say, by the application processing section 120, in the processing of the application such as the game program, it may be presented to the user what pose with the hands is requested. Specifically, at the time of execution of the game application, an instruction that "grasp the shoulder!" or the like may be issued to the user, and the distance obtained by the calculation may be set as a length between both the shoulders, and the information associated with the length or size of the portion to be obtained may be obtained by referring to the database of the body proportions.

In the embodiment, the pieces of information associated with the distances obtained by the calculation are different from each other depending on which length of the portion of the body of the user the measurement value is proportional to, according to every pose with the hands at the time of the measurement. Therefore, the application processing section 120 provides, together with the instruction for the pose, when the pose based on an instruction is held, the information representing that the distance obtained by the calculation corresponds to the length of which portion and the information necessary for obtaining the length or size of the necessary portion such as a rate with respect to that length. The measurement processing section 110 of the information processing apparatus 1 obtains the length or size of the necessary portion by using the provided information of interest, and outputs the information of interest to the application processing section 120.

[Timing of Measurement]

In addition, although in the description until now, the timing of the measurement is set as the timing at which standby time has elapsed, the standby time being considered necessary to take for the user to hold the pose with the hands after the pose is guided or after the activation, the embodiment is by no means limited thereto.

In a certain example of the embodiment, the timing of the measurement may be set as a timing at which the shock sensor 243 of at least one of the device 20L fixed to the left hand and the device 20R fixed to the right hand detects the shock, or a timing at which both the shock sensors 203 of the device 20L fixed to the left hand and the device 20R fixed to the right hand detect the shock all at once. The measurement processing section 100 decides that at the timing of interest, the hands of the user hold the guided pose described above, and executes the processing of the measurement.

In this example of the embodiment, when the user activates the information processing apparatus 1 to start the communication between the device 20 and the information processing apparatus 1, an image which requests the user to hold the predetermined pose with the hands which pose is previously set is outputted to the output section 15. Based on that image, the image of the pose with the hands, for example, exemplified in FIG. 5 or FIG. 7, and the guidance that "Please, hold this pose" are displayed.

Then, the information processing apparatus 1 stands by until a state is obtained in which the user holds the pose. In the case where the user holds the pose, the data associated with which is outputted from the information processing apparatus 1, and which is displayed on a household use television or the like, when the left and right hands contact each other (the fingers are brought into contact with each other), both the shock sensors 243 of the device 20L fixed to the left hand and the device 20R fixed to the right hand detect the shock all at once, and output a signal representing the effect. When the information processing apparatus 1 outputs the signal representing the effect that both the shock sensors 243 of the device 20L fixed to the left hand and the device 20R fixed to the right hand detect the shock all at once, the information processing apparatus 1 decides that the hands of the user hold the guided pose. Then, the information processing apparatus 1 causes the device 20 to light the LED as the position presenting processing section 213, and detects the positions of the position presenting sections 213L and 213R of the devices 20L and 20R which are respectively fixed to the left and right hands of the user.

Then, the information processing apparatus 1 obtains the information PL associated with the position of the position presenting section 213L of the device 20L fixed to the left hand, and the information PR associated with the position of the position presenting section 213R of the device 20R fixed to the right hand. Then, the information processing apparatus 1 calculates the distance between the positions represented by the information obtained. Here, in the case where the user holds the pose with the hands exemplified in FIG. 5, that distance corresponds to the sum of the lengths of the middle fingers of the left hand and the middle fingers of the right hand.

The information processing apparatus 1 sets ½ of the calculated distance as the length of the middle finger of the user. The information processing apparatus 1 obtains the information associated with the length or size of the necessary portion of the body of the user by using the rate of the length or size of the portion of the body of the user (for example, the height, the length of the arm, the size of the hand or the like) with respect to the length of the middle finger by referring to the database of the body proportions. The information processing apparatus 1 applies the resulting information to the processing of the application.

In addition, in another example of the embodiment, instead of the timing at which the shock sensor 243 detects the shock, or together with that timing, in a state in which a difference between the detection angles detected by the inclination sensors 243 falls within the threshold value previously decided, when a predetermined time has elapsed, it may be decided that the hands of the user hold the guided pose. In this example, while the information processing apparatus 1 stands by until the state is obtained in which the user holds the pose, the information processing apparatus 1 repetitively receives the input of the information associated with the detection angles detected by the respective inclination sensors 242. Then, the information processing apparatus 1 obtains a difference $\Delta\theta=|\theta L-\theta R|$ between information $\theta L$ associated with the detection angle outputted by the device 20L fixed to the left hand of the user, and information $\theta R$ associated with the detection angle outputted by the device 20R fixed to the right hand of the user. Here, |X| means an absolute value of X.

Then, the information processing apparatus 1 stands by until a state is obtained in which $\Delta\theta$ exceeds a previously decided threshold value $\theta_{th\_min}$, and falls below $\theta_{th\_max}$ (until a state is obtained in which the difference between the detection angles detected by the respective inclination sensors 242 falls within a range of the previously decided threshold values). When $\Delta\theta$ falls within the range of the previously decided threshold values, the information processing apparatus 1 acquires the time at that time from a clock section (not depicted). Thereafter, if for the period of time from the time thus acquired to time at which the previously decided time (for example, 2 seconds) has elapsed, $\Delta\theta$ calculated from the information associated with the detection angles inputted from the devices 20L and 20R which are respectively fixed to the left and right hands of the user departs from the range of the threshold values described above, the information processing apparatus 1 returns back to the processing for standing by until $\Delta\theta$ falls within the range of the threshold values previously decided again. On the other hand, if for the period of time from the time thus acquired to the time at which the previously decided time has elapsed, $\Delta\theta$ calculated from the information associated with the detection angles inputted from the devices 20L and 20R which are respectively fixed to the left and right hands of the user does not depart from the range of the threshold values described above, then, the information processing apparatus 1 decides that the user holds the guided pose with the hands. Then, the information processing apparatus 1 causes the device 20 to light the LED as the position presenting section 213, and detects the positions of the position presenting sections 213L and 213R of the devices 20L and 20R which are respectively fixed to the left and right hands of the user from the image data outputted from the imaging section 14. In this example of the embodiment, the decision can be performed, including whether or not the direction of the palms of the hands of the user is set as the state of the specified pose.

REFERENCE SIGNS LIST

1 Information processing apparatus, 11 Control section, 12 Storage section, 13 Interface section, 14 Imaging section, 15 Output section, 20 Device, 21 Control section, 22 Storage section, 23 Manipulation interface, 24 Sensor section, 25 Communication section, 110 Measurement processing section, 111 Device position detecting section, 112 Calculating section, 120 Application processing section, 210 Device main body, 211 Gripper, 212 Manipulation section, 213 Position presenting section, 220 Fixture, 231 Button manipulation section, 241 Finger sensor, 242 Inclination sensor, 243 Shock sensor.

The invention claimed is:

1. An information processing apparatus connected to a first device fixed to a left hand of a user and to a second device fixed to a right hand of the user, comprising:
   detection means detecting a position of the first device and a position of the second device; and
   calculation means calculating information associated with a size of the hand of the user on a basis of a difference between the detected positions.

2. The information processing apparatus according to claim 1, further comprising:
   guidance means guiding the user to a pose with the hand of the user; and
   decision means deciding whether or not the hand of the user hold the guided pose, wherein
   when the decision means decides that the hand of the user hold the guided pose, the detection means detects the position of the first device and the position of the second device, and the calculation means calculates information associated with the size of the hand of the user on the basis of a difference between the detected positions.

3. The information processing apparatus according to claim 2, wherein,
   at least one of the first device and the second device has a shock sensor detecting a shock,
   the guidance means guides a pose in which the left hand and the right hand are brought into contact with each other in a predetermined position, and after the guidance by the guidance means, when the shock sensor of the at least one of the first device and the second device detects the shock, the decision means decides that the hand of the user hold the guided pose.

4. The information processing apparatus according to claim 2, wherein each the first device and the second device has an inclination sensor for detecting an inclination angle, and after the guidance by the guidance means, in a state in which a difference between the inclination angle detected by the inclination sensor of the first device and the inclination angle detected by the inclination sensor of the second device falls within a range of predetermined threshold values, when a predetermined time has elapsed, the decision means decides that the hand of the user hold the guided pose.

5. The information processing apparatus according to claim 2, wherein the pose guided by the guidance means is a pose in which a fingertip of a finger of the left hand and a fingertip of a same finger of the right hand are brought into contact with each other, in an extended position.

6. The information processing apparatus according to claim 1, wherein each the first device and the second device has a sensor detecting a width of a palm of the hand, the sensor being fixed to a position where the sensor is brought into contact with at least a part of the palm of the hand of the user, and the calculation means calculates information associated with the size of the hand of the user on the basis of the difference between the detected positions and of the width of the palm of the hand of the user, the width being detected by the sensor detecting the width of the palm of the hand.

7. The information processing apparatus according to claim 1, wherein a size of at least a part of an object becoming a target to be displayed is set based on the information associated with the size of the hand of the user, the information being calculated by the calculation means, and the object of interest is displayed.

8. A method of controlling an information processing apparatus, by using the information processing apparatus connected to a first device fixed to a left hand of a user and to a second device fixed to a right hand of the user, comprising:

detecting a position of the first device and a position of the second device by detection means; and calculating information associated with a size of the hand of the user on a basis of a difference between the detected positions by calculation means.

9. A non-transitory computer readable storage medium storing a program for an information processing apparatus connected to a first device fixed to a left hand of a user and to a second device fixed to a right hand of the user, the program comprising:

by detection means, detecting a position of the first device and a position of the second device; and by calculation means, calculating information associated with a size of the hand of the user on a basis of a difference between the detected positions.

* * * * *